United States Patent
Igl et al.

(10) Patent No.: US 6,765,733 B1
(45) Date of Patent: Jul. 20, 2004

(54) SYSTEM AND METHOD FOR MOUNTING COMPONENTS USING BALL AND SOCKET STRUCTURE

(75) Inventors: Scott A. Igl, Seattle, WA (US); Roger F. Johnson, Bellevue, WA (US); David W. Rook, Kent, WA (US); Derek E. Schulte, Seattle, WA (US)

(73) Assignee: Nlight Photonics Corporation, Seattle, WA (US)

(*) Notice: Subject to any disclaimer, the term of this patent is extended or adjusted under 35 U.S.C. 154(b) by 162 days.

(21) Appl. No.: 10/145,512

(22) Filed: May 14, 2002

Related U.S. Application Data

(60) Provisional application No. 60/364,334, filed on Mar. 14, 2002.

(51) Int. Cl.⁷ ............................ G02B 7/02; G02B 7/182; H01S 3/10
(52) U.S. Cl. .................. 359/822; 359/811; 359/819; 359/872; 372/9; 372/107
(58) Field of Search .............................. 359/811, 819, 359/813, 820, 822, 871, 872; 372/107, 9, 15

(56) References Cited

U.S. PATENT DOCUMENTS

| | | | | |
|---|---|---|---|---|
| 5,319,668 A | | 6/1994 | Luecke | |
| 5,502,598 A | * | 3/1996 | Kimura et al. | 359/822 |
| 5,748,393 A | * | 5/1998 | Edwards | 359/822 |
| 5,946,127 A | * | 8/1999 | Nagata | 359/822 |
| 5,986,827 A | * | 11/1999 | Hale | 359/822 |
| 6,111,706 A | * | 8/2000 | Incera et al. | 359/819 |
| 6,198,580 B1 | * | 3/2001 | Dallakian | 359/822 |
| 6,320,706 B1 | * | 11/2001 | Richard et al. | 359/872 |
| 6,330,253 B1 | * | 12/2001 | Tuganov et al. | 372/9 |
| 6,483,438 B2 | * | 11/2002 | DeLine et al. | 359/872 |

OTHER PUBLICATIONS

U.S. patent application Ser. No. 60/364,334, Igl et al.

* cited by examiner

*Primary Examiner*—Loha Ben
(74) *Attorney, Agent, or Firm*—Fulbright & Jaworski, L.L.P.

(57) ABSTRACT

Disclosed are systems and methods providing adjustable mounting with multiple degrees of freedom, such as three degrees of freedom allowing controlled adjustment of pitch, roll, and/or yaw. In providing such degrees of freedom, a ball member of a ball and socket mounting apparatus may preferably be disposed upon a surface and a mount, having a socket portion sized and shaped to correspond to a mating surface of the ball member, may be placed in communication therewith. The mount may have a component to be mounted placed thereon after the mount is placed in communication with the ball member. Preferably as part of the system manufacturing process, an adjustment mechanism is placed in communication with the mount and provides manipulating forces thereto, preferably causing the socket portion of the mount to slidably engage the mating surface of the ball member, in order to precisely position a component mounted thereon.

54 Claims, 4 Drawing Sheets

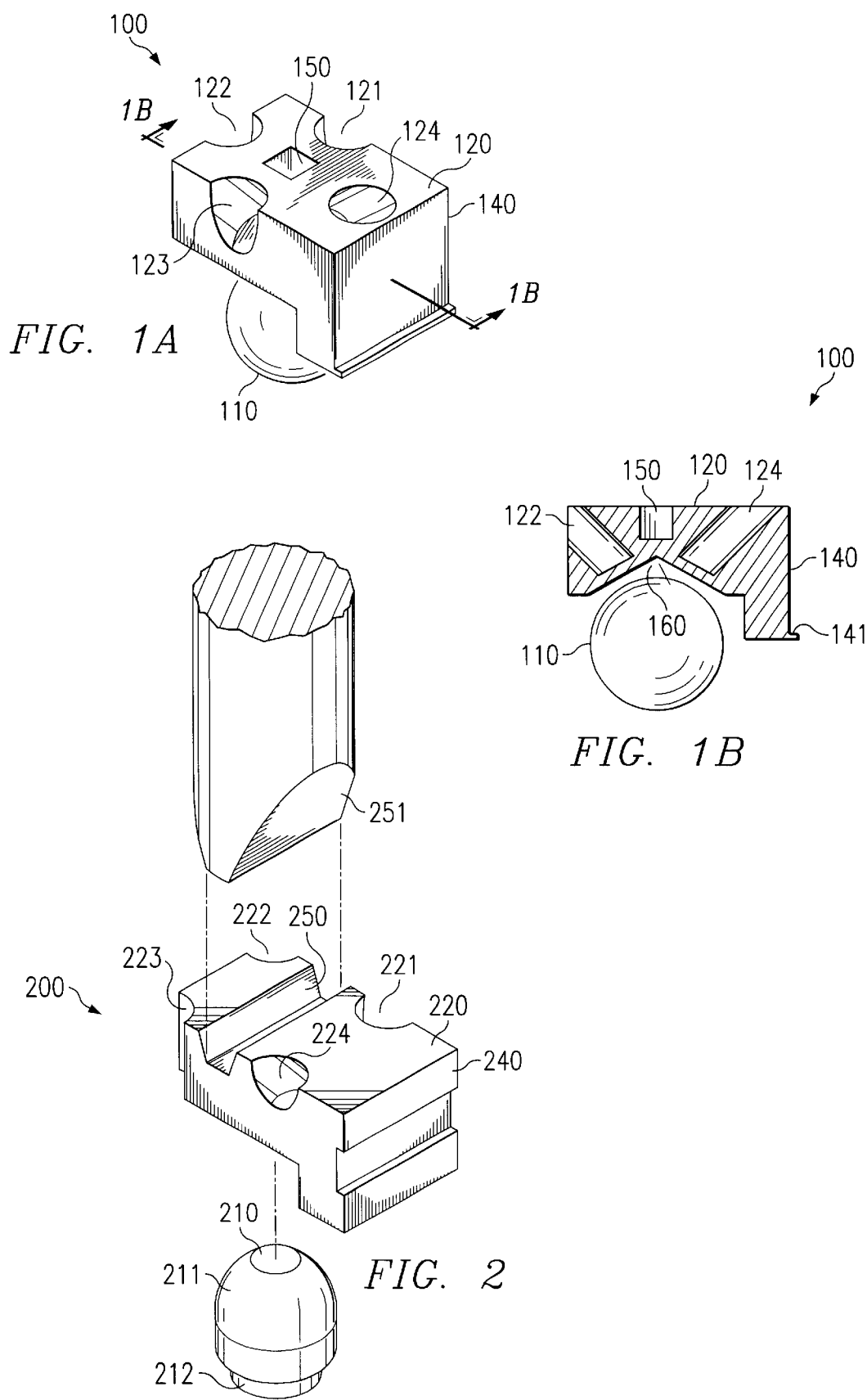

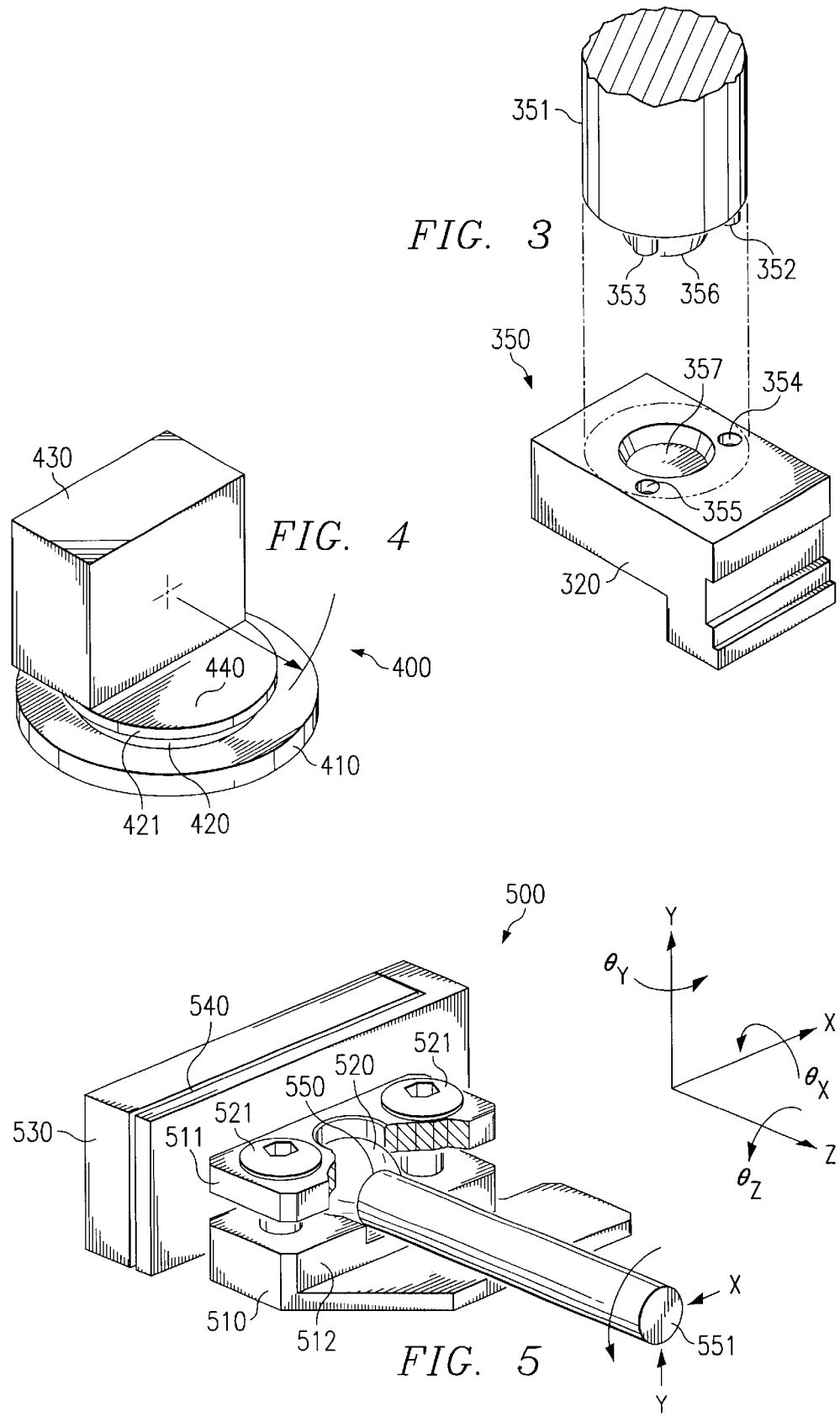

SYSTEM AND METHOD FOR MOUNTING COMPONENTS USING BALL AND SOCKET STRUCTURE

RELATED APPLICATIONS

Priority is hereby claimed to co-pending and commonly assigned U.S. provisional patent application serial No. 60/364,334 entitled "System and Method for Mounting Components Using Ball and Socket Structure," filed Mar. 14, 2002, the disclosure of which is hereby incorporated herein by reference in its entirety.

TECHNICAL FIELD OF THE INVENTION

The present invention relates generally to adjustably mounting objects and, more particularly, to providing adjustable mounting having multiple degrees of freedom.

BACKGROUND OF THE INVENTION

In the field of optics, and micro-optics in particular, it is often desirable to dispose particular components with a precise relationship with respect to one another. Such a precise relationship may not only involve a precise spacing, but may also include such attributes as proper relative orientation, position, and/or the like. Accordingly, challenges are presented with respect to initially placing components in such positions as well as retaining the desired precise relationship throughout a useful life of the system.

For example, in the past micro-optics manufacturers have utilized various adjustable mounting structures to allow the imprecise positioning of various components during an initial manufacturing process to be adjusted during a later manufacturing process in order to provide, or approach, a desired precise relationship of components. One such prior solution has been to utilize a metal strap or straps coupling an optic mount to a surface, and physically deforming the metal of the strap or straps to provide controlled movement of the optical mount in pitch, roll, or yaw. Although being a relatively widely accepted technique for positioning microoptics, this technique suffers from several disadvantages. For example, deformation of the metal straps for positioning the optical mount results in putting stress into the straps, generally later resulting in "creep," or the relaxing of stresses in the stressed components, which will result in altering the position of the optic mount. A further disadvantage of such prior techniques is that, although such techniques are well suited for providing movement with respect to one or two degrees of freedom for an optical mount, it is often very difficult to provide movement having three simultaneous degrees of freedom in an optic mount using such techniques.

Another solution used in the past to provide, or approach, a desired precise relationship of components has been to use a flexure mount. A typical flexure mount configuration provides a flexure arm having a pivot point and a flexure adjustment mechanism, such as a screw, engaging the flexure arm. An optic mount may be disposed at the pivot point, such that adjustment of the adjustment mechanism will cause the flexure arm to flex and, thus, provide translation to the optic mount. For example, an adjustment mechanism screw may be operated to engage the flexure arm and, thereby, push on the flexure arm. Pressure from the adjustment mechanism screw may cause the flexure arm to deform under the stress and provide a desired movement of the optic mount. The flexure mount technique, although relying upon stressing components thereof to provide optic mount translation, typically result in lessened adverse effects associated with creep than the above mentioned strap deformation technique as the flexure mount technique typically employs an adjustment mechanism which continues to apply an adjustment force against the flexure arm throughout the operational life of the system. However, such a technique suffers from disadvantages nonetheless. For example, in order to provide very fine resolution with respect to the adjustment provided a very long flexure arm is generally required which can result in a very large and cumbersome embodiment. Moreover, the use of such flexure techniques are not easily adapted to provide more than one degree of freedom with respect to translation of an optic mount.

BRIEF SUMMARY OF THE INVENTION

The present invention is directed to systems and methods which provide adjustable mounting techniques providing multiple degrees of freedom, such as three degrees of freedom allowing controlled adjustment of pitch, roll, and/or yaw. Preferred embodiments of the invention are adapted to provide a plurality of degrees of freedom in movement of a mount, such as a micro-optical mount, substantially without applying stress to mounting components. Accordingly, preferred embodiments of the present invention are adapted to not only provide for precise placement of particular components, such as micro-optic components disposed upon a micro-optic mount, but to reliably maintain such precise placement throughout the useful life of a system.

Embodiments of the invention provide three degrees of angular freedom using a ball and socket configuration. Such embodiments provide complete freedom to move an optic, or other component, angularly. Moreover, preferred embodiments provide a very small optic mounting apparatus which is suitable for use in confined areas, such as the cavity of an incoherently beam combined (IBC) laser. However, it should be appreciated that embodiments of the present invention may be utilized with other types of resonators, optical devices, etcetera.

According to a preferred embodiment, a ball member of a ball and socket mounting apparatus is disposed upon a surface, such as an IBC laser cavity surface, in a particular position corresponding to a desired position of a component to be mounted. Thereafter, a mount having a socket portion sized and shaped to correspond to a mating surface of the ball member is placed in communication with the ball member. The mount may have a component to be mounted placed thereon after the mount is placed in communication with the ball member. However, a preferred embodiment of the present invention disposes a component to be mounted upon the mount prior to its being placed in communication with the ball member, to facilitate precise placement of the component upon the mount and/or to provide a technique more readily adapted to automated production.

Preferably as part of the system manufacturing process, an adjustment mechanism is placed in communication with the mount and provides manipulating forces thereto, preferably causing the socket portion of the mount to slidably engage the mating surface of the ball member, in order to precisely position a component mounted thereon. Accordingly, preferred embodiments of the mount are adapted to engage an adjustment mechanism and receive bias forces consistent with three degrees of movement with respect to the mount. Additionally, embodiments of the mount and/or the ball member are preferably adapted to retain a particular position, such as through the application of an adhesive, weld, or other fastening technique to a fastening portion thereof.

It is believed that the use of ball and socket mounting configurations, such as those of embodiments of the present invention, have been avoided in the past due at least in part to the difficulty typically experienced in separating yaw, pitch, and roll movement thereof in order to provide independent selection and control with respect to these various degrees of freedom of movement. Preferred embodiment mounting apparatus described herein facilitate independent selection and control of movement with respect to each of the available degrees of freedom, preferably using an external adjustment mechanism. However, it should be appreciated that alternative embodiments of the present invention may provide multiple coupled translation axes such that two or more rotational axes of a mount are simultaneously involved in an adjustment thereof.

Preferred embodiments of the present invention not only provide isolated movement in various degrees of freedom, but provide such movement with nominal translation of a component to be adjusted about the pivot point. The ability to provide freedom of adjustment of a component mounted upon a mounting apparatus of the present invention while introducing zero to nominal translation about the pivot point is particularly useful in certain optical applications.

Preferred embodiments of the present invention remove much of the complexity associated with providing controlled movement to external tooling, which can be relatively complicated because it will likely be deployed in relatively small numbers, providing the desired level of control with respect to movement of a mounted component. Such a configuration allows for the preferred embodiment ball and socket mounting apparatus, which will likely be deployed in great numbers, to adopt a relatively simple and inexpensive configuration. In contrast, conventional mounting techniques typically have embodied within them the actuator means, such as screws and levers, to provide the adjustment. These actuator means both add to the cost of each mount, introduce potential for creep, as well as add bulk or volume to the mount.

Once an adjustment mechanism of the preferred embodiment is used to precisely orient a component, the adjustment mechanism may be withdrawn from the manufactured system, with only the ball and socket mounting apparatus and its associated fastening means surviving into the manufactured system. Fastening means utilized according to the present invention may include the application of an adhesive, solder, laser welding, general welding, friction, and/or the like. Such embodiments provide for a very small mount allowing precise adjustment of the component's position.

In addition to providing a less complicated and less expensive manufactured system, the preferred embodiment further provides a mounting configuration less prone to the adverse affects of creep. Specifically, as the preferred embodiment mounting technique does not rely upon stressing any material for providing the desired movement, the resulting mount is less prone to creep.

Alternative embodiments of the present invention may provide variations with respect to the above described ball and socket mounting apparatus. For example, rather than providing a ball member for disposing on a surface and a mount having a socket portion thereof, an alternative embodiment of the present invention may provide a socket portion adapted for disposing upon a surface and a ball member adapted to provide a mount. Such an embodiment may be utilized to dispose a component mounted on the ball member coincident with the radius of curvature of the ball member and, thereby, facilitate adjustments of yaw, pitch and roll while maintaining a position with respect to a portion of the component coincident with the center of the curvature of the ball member.

It should be appreciated that the preferred embodiment ball and socket mounting apparatus configuration of the present invention allows for controlled movement of a mount portion there of, and accordingly a component disposed thereon, in a plurality of directions. Accordingly, a most preferred embodiment of the present invention provides for three degrees of freedom with respect to movement of a system component, such as a micro-optic component mounted in an optic system.

Embodiments of the present invention provide for the placement of a component to be mounted relative to the ball and socket mounting apparatus such that the component rotates directly on the center of rotation of the ball and socket joint. For example, embodiments of the present invention may dispose any or all axes of rotation of a component coincident with the center of rotation of the ball and socket joint. Such embodiments may be configured to avoid linear translation of the mounted component throughout adjustment in any or all of the degrees of freedom of movement available. The ability to avoid linear translation may be highly desirable in particular implementations, such as in an optic steering mechanism.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIGS. 1A and 1B show an embodiment of ball and socket mounting apparatus according to the present invention;

FIG. 2 shows a preferred embodiment ball and socket mounting apparatus configuration according to the present invention;

FIG. 3 shows a mount and probe configuration according to an embodiment of the present invention;

FIG. 4 shows an embodiment of a ball and socket mounting apparatus according to the present invention;

FIG. 5 shows an embodiment of a ball and socket mounting apparatus according to the present invention;

DETAILED DESCRIPTION OF THE INVENTION

Figures 6, 7A:
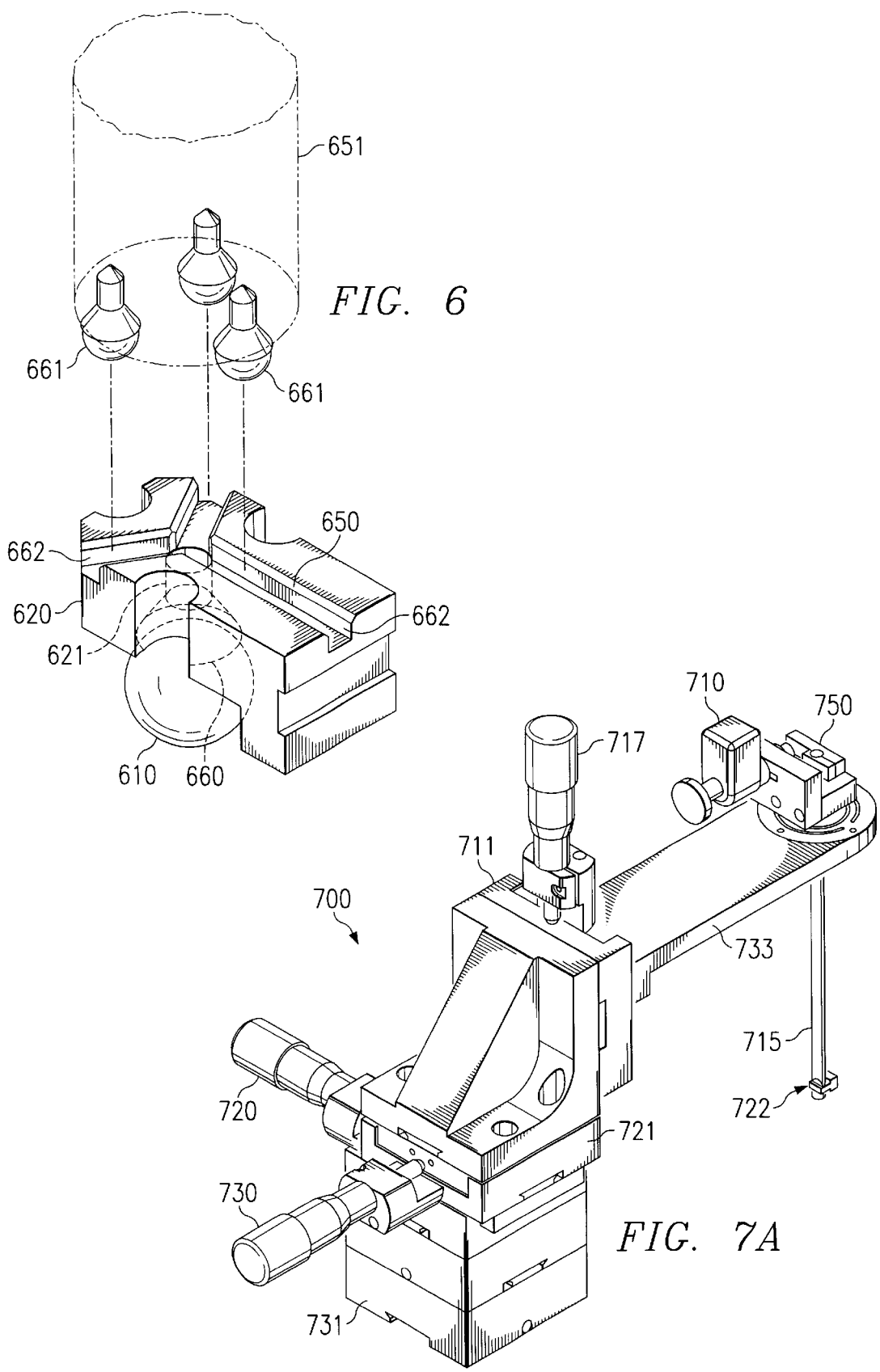
FIG. 6 shows a mount and probe configuration according to an embodiment of the present invention.
FIGS. 7A–7C show a preferred embodiment of external tooling used with a ball and socket mounting apparatus according to the present invention.

Directing attention to FIGS. 1A and 1B, a simplified example of a ball and socket mounting apparatus of the present invention is shown as mounting apparatus 100. Mounting apparatus 100 may be utilized to provide mounting and precise, controlled movement of a micro-optic component, such as a laser diode or diode array, a mirror, a diffraction grating, a lens or lens array, and/or the like, of an optical system, such as an external cavity laser, e.g., an incoherently combined beam (IBC) laser, or the like. It should be appreciated that, although preferred embodiments are described herein with respect to micro-optic components in an optical system, the present invention is applicable to a variety of components and systems. For example, embodiments of the present invention may be utilized to provide precise placement of radio frequency system components.

Mounting apparatus 100 of the illustrated embodiment includes ball member 110 and mount 120, which in FIGS. 1A and 1B are shown not fully engaged. Mount 120 is preferably adapted to interface with ball member 110 and slidably engage a mating surface thereof For example, mount 120 may include conical cavity 160 disposed in an interface surface thereof which, when placed in juxtaposition with ball member 110, receives a portion of the mating surface of ball member 110. When fully engaged, at least a portion of the mating surface of ball member 110 is preferably in intimate contact with a portion of an interfacing surface, e.g., sides of conical cavity 160, of mount 120. Such intimate contact provides multiple contact points and/or a continuous contact area sufficient to stably support mount 120 upon ball member 110. For example, a spherical cavity may be formed in mount 120 which corresponds to a spherical mating surface of ball member 110. However, a conical cavity, as illustrated, or other interfacing surface providing less than full contact between the mating surface of ball member 120 and the interfacing surface of mount 120 is preferred for such reasons as accommodating surface irregularities, reduce frictional forces experienced when providing adjustment, and the like.

According to a preferred embodiment, the mating surface of ball member 110 and the corresponding interfacing surface of mount 120 are polished, or otherwise prepared, to provide for smooth movement between these components. Such an embodiment facilitates fine movement resolution as may be desirable with respect to the mounting of microcomponents.

The preferred embodiment of mount 120 is further adapted to accept a component to be mounted thereon (not shown). For example, mount 120 shown in FIGS. 1A and 1B includes component receiving surface 140. Component receiving surface 140 is preferably sized, shaped, oriented, and/or adapted to accept particular components to be mounted and precisely positioned using mounting apparatus 100. Receiving surface 140 of the illustrated embodiment presents a flat surface upon which a number of micro-optical components, such as a laser diode array, mirror, or defraction grating, may be attached, such as using adhesives, solders, fasteners, and/or other attachment techniques well known in the art. The receiving surface may be specifically adapted to facilitate the proper placement and/or fastening of such a device, such as by including fastener receiving portions, e.g., screw taps, and the like. The illustrated embodiment of receiving surface 140 includes ledge 141 to both assist in positioning a micro-optic device attached to receiving surface 140 and to support the micro-optic device.

It should be appreciated that, when properly interfaced with ball member 110, mount 120, and therefore a component disposed thereon, may be moved in three degrees of freedom, specifically roll, pitch, and yaw. In order to provide precise control of adjustment of the position of mount 120 upon ball member 110, mount 120 is preferably adapted to interface with external tooling. For example, mount 120 of the illustrated embodiment includes receiver 150 adapted to receive a probe from external tooling. Preferably, such a receiver is adapted to securely engage the probe of external tooling to thereby facilitate predictable movement of mount 120 in response to control of the probe by the external tooling. Preferred embodiments of external tooling as may be utilized according to the present invention is discussed in further detail below.

Mounting apparatus 100, in addition to being adapted to provide precise adjustment with three degrees of freedom, is also preferably adapted to reliably maintain a particular selected position of mount 120, and therefore a component disposed thereon, upon ball member 110. Accordingly, mount 120 of the preferred embodiment includes fastening elements 121–124. Additionally or alternatively, ball member 110 may include fastening elements, whether utilizing the same fastening technique as mount 120 or not, for use in maintaining a particular selected position of mount 120.

Fastening elements 121–124 of the illustrated embodiment comprise laser weld pockets, grooves, or other structure which present a relatively thin portion of mount 120 in correspondence to the mating surface of ball member 110 when engaged with mount 120. Accordingly, once mount 120 is disposed in a proper position with respect to ball member 110, laser beams may be directed into the pockets of fastening elements 121–124 to weld mount 120 onto ball member 110.

It should be appreciated, that although the aforementioned laser welding may result in a certain amount of stress being introduced into the material of the fastening elements, it is not expected that any creep associated therewith will result in undesired movement of a component mounted using mounting apparatus 100. Specifically, the stress introduced according to this preferred embodiment is associated only with a tack weld, as opposed to providing deforming of a structural member for positioning purposes, and therefore any creep associated therewith is not likely to result in appreciable movement of the mount. Moreover, the preferred embodiment includes a number of fastening elements disposed, preferably symmetrically, about mount 120. The placement of such fastening elements is selected according to the preferred embodiment to allow creep associated with ones of the fastening elements to substantially counteract creep associated with other ones of the fastening elements. Of course, alternative embodiments of the present invention may utilize various other fastening techniques and combinations of fastening techniques, some of which are discussed below with respect to other embodiments described herein.

Referring now to FIG. 2, mounting apparatus 200 of a preferred embodiment is shown. Mounting apparatus 200, although adopting the principals of operation discussed above with respect to mounting apparatus 100, is adapted for an engineering application.

For example, although still comprising a mating surface as discussed above, mating surface 211 of ball member 210 is configured as a frustum of a sphere. Accordingly, a spherical mating surface suitable for allowing slidable interfacing of mount 220 throughout a desired range of movement is provided. However, ball member 210 is further adapted for use according to the present invention. For example, ball member 210 includes lug 212 for fastening ball member 210 to a surface. For example, where mounting apparatus 200 is to be used in mounting a defraction grating in the cavity of an IBC laser, a cavity surface of the IBC laser may include an orifice, disposed at a position corresponding to an approximate placement of a component to be mounted using mounting apparatus 200, to accept lug 212 and thereby hold ball member 210 within the system. Ball member 210 may be fastened into such a system using any of a number of techniques, including friction fitting, soldering, application of adhesive, mechanical fasteners, and/or the like.

Mount 220 of mounting apparatus 200 includes variations over the configuration of mount 120 discussed above. For example, receiver 250 of mount 220 comprises a V groove for accepting a substantially blunt head probe of external tooling for actuation of the mount substantially as described above. A portion of a probe portion of the external tooling is shown as probe 251, which is sized and shaped to correspond to receiver 230. In the illustrated embodiment, receiver 250, like receiver 150 of FIGS. 1A and 1B, is preferably disposed over the center of a spherical mating surface of ball member 210 so that there is no overturning moment as external force is applied to mount 220 by probe 251. It should be appreciated that such a disposition of receiver 250 is preferable as this particular receiver configuration does not capture the probe and, therefore, is susceptible to disengaging during radical movement of mount 220. In contrast, receiver 150 of mounting apparatus 100 provides a configuration which captures the corresponding probe and, therefore, may be more suitable for use in configurations where the receiver is not disposed to avoid overturning moment.

Fastening elements 221–224 of the illustrated embodiment of mount 220 include holes bored through to an interfacing surface of mount 220. Accordingly, an epoxy, solder, or some other bonding agent may be applied into fastening elements 221–224 to contact a portion of both mount 220 and ball member 210 such that, once the adhesive cures, mount 220 is firmly bonded at its final adjustment position. Accordingly, once probe 251 has been controlled to position mount 220 in a proper position upon ball member 210, adhesive may be applied to fastening elements 221–224 to firmly hold the desired position. It should be appreciated that such an embodiment of the mounting apparatus introduces substantially no stress into the components thereof and, therefore, is unlikely to experience the adverse effects of creep.

Component receiving surface 240 of mounting apparatus 200, like component receiving surface 140 discussed above, is preferably sized, shaped, oriented, and/or adapted to accept particular components to be mounted and precisely positioned using mounting apparatus 200. Receiving surface 240 of the illustrated embodiment includes a channel disposed in the flat surface thereof to engage a component, or portion thereof, to be mounted by mounting apparatus 200. For example, the channel shown in receiving surface 240 may provide an area into which epoxy, solder, or other adhesive material may expand or otherwise flow during mounting of a component to mount 220. The receiving surface may additionally or alternatively be adapted to facilitate the proper placement and/or fastening of such a device, such as by including fastener receiving portions, e.g., screw taps, and the like.

FIG. 3 illustrates another variation of a mount, such as may be used in conjunction with ball member 210 or other member corresponding to the interface surface of the mount. Mount 320 of FIG. 3 provides a receiver configuration adapted to provide precise engagement and capturing of a corresponding probe to thereby facilitate precise adjustment of mount 320 in three degrees of freedom. Receiver 350 of mount 320 includes conic detent 357 corresponding to conic tab 356 of probe 351. It should be appreciated that use of conic detent 357 of receiver 350 allows probe 351 to properly center and engage mount 320 to provide controlled movement of mount 320 in the pitch and roll degrees of freedom. However, the illustrated conic detent of receiver 350 and corresponding conic tab of probe 351 are unlikely to provide sufficient control with respect to movement in the yaw degree of freedom. Therefore, receiver 350 of FIG. 3 includes pin holes 354 and 355, corresponding to pins 352 and 353 of probe 351, respectively. Accordingly, once probe 351 filly engages mount 320, a twisting motion around the center of probe 351 may be transferred to mount 320 by pins 352 and 353 so that mount 320, and therefore a component disposed thereon, may be controllably placed in a desired position.

It should be appreciated that detent 357 may be bored through mount 320, if desired, to expose a portion of a mating surface of a corresponding ball member when the mounting apparatus is assembled. Similarly, receiver 150 of the embodiment of FIG. 1 may be bored through mount 120 to expose a portion of the mating surface of ball 110 when mounting apparatus 100 is assembled. Such a receiver configuration may be utilized not only to provide a probe interface, and therefore precise adjustment of the mount, but may also be utilized for the application of an adhesive, solder, or other agent for retaining a desired relationship of the mount and ball member. For example, probe 351 may be adapted to deliver such an agent to receiver 350, if desired. It should be appreciated that the preferred embodiments of receivers 350 and 150, when bored through the respective mounts, provide for a symmetric (with respect to the rotational axes) application of fastening forces and, therefore, is unlikely to bias the mount during adhesive curing or solder cooling. Such an embodiment provides for precise alignment and is also unlikely to cause movement associated with creep.

Directing attention to FIG. 4, an alternative mounting apparatus of the present invention is shown as mounting apparatus 400. Mounting apparatus 400 presents an inverted ball and socket mounting system as compared to those described above. Specifically, mount 420 includes a frustum of a sphere providing a mating surface to engage socket member 410. Like ball member 210 of FIG. 2, socket member 410 of FIG. 4 is preferably adapted to be disposed upon a surface of a system and to receive mount 420. However, socket member 410 is preferably adapted to interface with ball type mating surface of mount 420 for sliding engagement thereof. For example, socket member 410 may include a conical cavity, as discussed above with respect to mount 120, which, when placed in juxtaposition with a ball type mating surface of mount 420, receives a portion of the ball type mating surface of mount 420. When fully engaged, at least a portion of the interfacing surface of socket member 420 is preferably in intimate contact with a portion of the ball type mating surface of mount 420.

The preferred embodiment of mount 420 is adapted to accept a component to be mounted thereon. For example, mount 420 includes component receiving surface 440 having component 430 disposed thereon. It should be appreciated that receiving surface 440 of the illustrated embodiment presents a flat surface upon which a number of micro-optical components, such as a laser diode array, mirror, or diffraction grating, may be attached, such as using adhesives, fasteners, and/or other attachment techniques well known in the art.

Component receiving surface 440 is preferably sized, shaped, oriented, and/or adapted to accept particular components to be mounted and precisely positioned using mounting apparatus 400. For example, receiving surface 440 is. disposed such that the center of the radius of the sphere of the ball type mating surface of mount 420 corresponds to a particular position on component 430 mounted thereon. Accordingly, as mount 420 is moved throughout the various degrees of freedom available from mounting apparatus 400, there is substantially no translation of component 430. For example, where component 430 comprises a micro-optic component, a focal point thereof may be disposed to correspond to the center of the radius of the sphere of the ball type mating surface of mount 420 and, thus, as mount 420 is moved throughout any or all of the degrees of freedom the focal point of component 430 will remain in a same position, although the view, e.g., the light path, associated therewith will be adjusted.

Mount 420, as with the preferred embodiment mounts described above, is also preferably adjusted through use of external tooling. Accordingly, mount 420 may include a receiver (not shown), preferably disposed out of the operational view of a component mounted thereon, such as behind component 430 in FIG. 4, to interface with a probe substantially as described above. Of course, rather than adapting a mount of the present invention to receive a probe, a component to be mounted thereon may be adapted to include a receiver thereon, such as to facilitate controlled movement without the probe interfering with an operational view of the component. Moreover, it should be appreciated that there is no requirement according to the present invention that a mount and/or a component to be mounted include a receiver as described herein. For example, an external tool probe may include an interface which brackets a portion of a mount of the present invention and/or a component thereon to provide controlled movement as described herein, if desired.

Socket member 410 and/or mount 420 are preferably adapted to reliably maintain a particular selected position of mount 420, and therefore component 430 disposed thereon, upon socket member 410. Accordingly, mount 420 and/or socket member 410 may include fastening elements thereon. For example, mount 420 includes annular lip 421 suitable for engaging an amount of epoxy, solder, or other adhesive placed in the nib region between mount 420 and socket member 410. A plurality of such "dollops" of epoxy may be placed around this nip region for use in maintaining a particular selected position of mount 420. Additionally or alternatively, the nib region may be laser welded or conventionally welded, if desired.

Another alternative ball and socket configuration is shown in FIG. 5 as mounting apparatus. 500. Like mounting apparatus 400 discussed above, mounting apparatus 500 presents an inverted ball and socket mounting system as compared to other mounting apparatus described herein. Accordingly, mount 520 includes mounting surface 540 coupled to a spherical portion thereof to engage socket member 510. Socket member 510 is preferably adapted to be disposed upon a surface of a system and to receive mount 520.

The preferred embodiment of mount 520 is adapted to accept a component to be mounted thereon. For example, mount 520 includes component receiving surface 540 having component 530 disposed thereon. Component receiving surface 540 is preferably sized, shaped, oriented, and/or adapted to accept particular components to be mounted and precisely positioned using mounting apparatus 500. It should be appreciated that receiving surface 540 of the illustrated embodiment presents a flat surface upon which a number of micro-optical components, such as a laser diode array, mirror, or diffraction grating, may be attached, such as using adhesives, solders, fasteners, and/or other attachment techniques well known in the art.

Socket member 510 is preferably adapted to interface with ball type mating surface of mount 520 for sliding engage thereof. For example, the illustrated embodiment of socket member 510 includes an upper and lower element, elements 511 and 512 respectively. Each such element may include conical seats to receive, and preferably slidably engage, a ball portion of mount 520. Of course, other configurations of a receiving surface may be utilized with respect to socket member 510 in providing an adjustable mount according to the present invention, if desired.

Mount 520, as with the preferred embodiment mounts described above, is also preferably adjusted through use of external tooling. Accordingly, mount 520 may include receiver 550, shown engaged with probe 551. Mating of receiver 550 and probe 551 preferably utilizes a square hole, a "D" hole, or the like to allow rotation of probe 551 to provide reliable roll adjustment of mount 520. It should be appreciated that linear motion of probe 551 along the X and Y axes may be utilized to provide yaw and pitch adjustment of mount 520, respectively.

In the illustrated embodiment, socket member is also adapted to cooperate with probe 551. Specifically, upper element 511 of socket member 510 includes cutaways to accommodate adjustment of mount 520 by movement of probe 551.

Socket member 510 and/or mount 520 are preferably adapted to reliably maintain a particular selected position of mount 520, and therefore component 530 disposed thereon, upon socket member 510. For example, socket member 510 may include fastening elements 521, shown as torque screws in the illustrated embodiment, suitable for compressing a ball portion of mount 520 between upper and lower elements 511 and 512 of socket member 510 for use in maintaining a particular selected position of mount 520. By putting medium torque on fastening elements 521, probe 551, such as may be coupled to translational stages and a bearing fixture or a flexure fixture to accommodate a desired range of motion, may be utilized to controllably position mount 520. Thereafter, fastening element 521 may be adjusted to increased torque to thereby reliably hold mount 520 in a desired position after probe 551 is withdrawn.

Having described various preferred embodiment mounting apparatus, a preferred embodiment of a probe useful therewith for providing controllable adjustment shall be described in detail with reference to FIG. 6. As with the probes described above, probe 651 of FIG. 6 preferably engages receiver 650 of mount 620. The illustrated embodiment of probe 651 includes kinematic couplers 661 disposed therein to engage corresponding slots 662 of receiver 650. Specifically, three kinematic couplers are provided in the illustrated embodiment to interface with three slots for kinematically coupling to the mounting apparatus, shown here including ball member 610 and mount 620, and providing movement with three degrees of freedom.

In the embodiment of FIG. 6, the kinematic mount provides a set of three grooves, slots 662, arranged at 120 degrees with respect to each other. Kinematic couplers 661 provide a ball bearing configuration for mating with these grooves. The combination of these features provides an isometrically balanced, kinematic mount between probe 651 and mount 620 which allows adjustments to pitch, roll and yaw without any hysteresis or backlash as the mount is moved. Moreover, the configuration of probe 651 and corresponding receiver 650 is adapted to allow mount 620 to be disengaged by probe 651 without introducing any additional torques to the mount.

It should be appreciated that mount 620 and/or ball member 610 may be configured substantially as described above with respect to various embodiments of mounting apparatus of the present invention. For example, mount 620 may include conical cavity 660 disposed in an interface surface thereof for interfacing with ball member 610. Additionally, mount 620 may include fastening element 621, such as may receive an adhesive or solder for fixing a desired position of mount 620 with respect to ball member 610. Mount 620 may additionally or alternatively be welded to ball member 610, such as at fastening element pockets disposed symmetrically into mount 620.

Figure 7B:
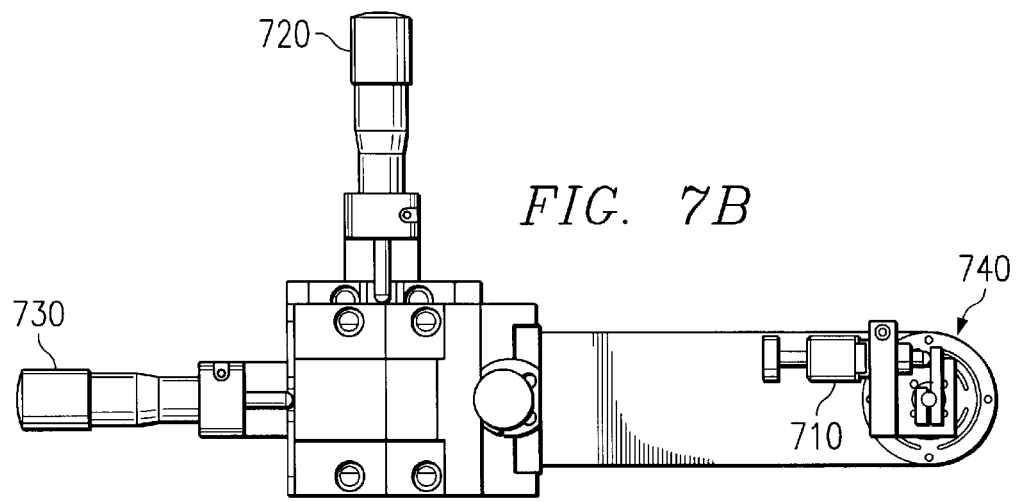
Figure 7C:
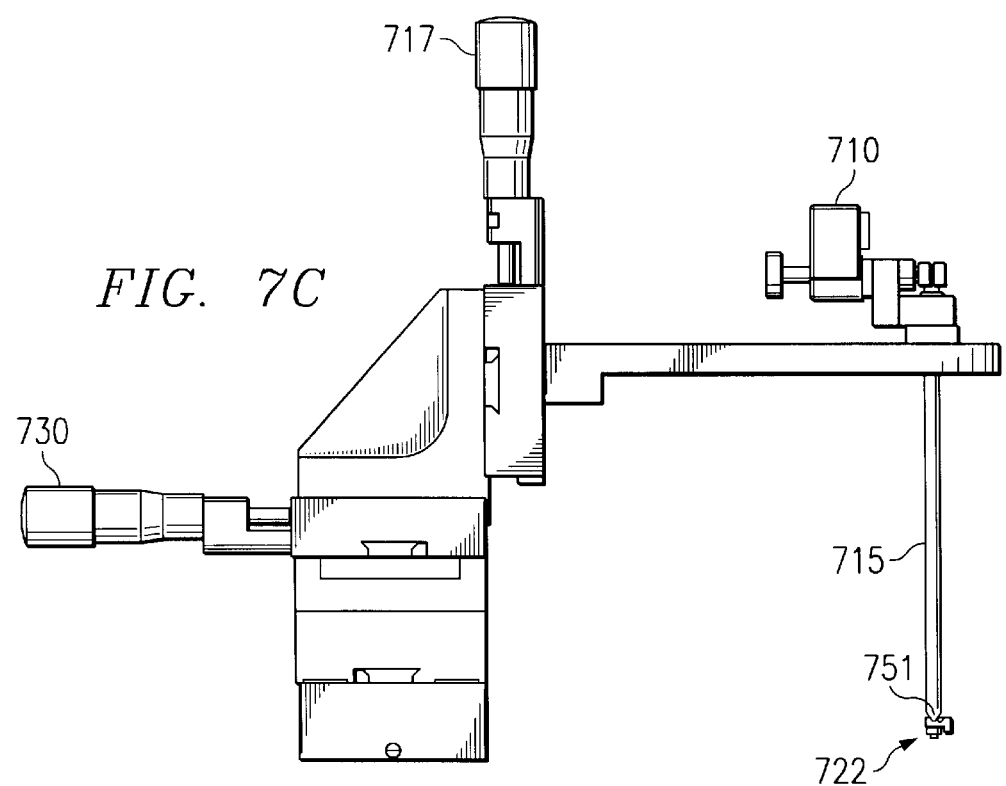

A preferred embodiment active alignment tool for use in adjusting the three degrees of freedom mounts of the present invention is shown in FIGS. 7A–7C. Active alignment tool 700, shown in an isometric view in FIG. 7A, is engaged with mounting apparatus 722, such as may be any of the mounting apparatus configurations discussed above or any other mounting apparatus configuration implementing the concepts of the present invention, through use of shaft 715. Shaft 715 preferably has a probe, shown as probe 751 in FIG. 7C, disposed upon a distal end thereof for interfacing with a corresponding receiver of mounting apparatus 722. It should be appreciated that probe 751 and a corresponding receiver may be of any configuration discussed above or any other configuration implementing the concepts of the present invention.

In providing adjustment of a mounting apparatus with three degrees of freedom according to the illustrated embodiment, active alignment tool 700 includes actuators 710, 717, 720, and 730 for providing controlled movement which is preferably translated to shaft 715. The actuators used according to the present invention may include such systems as manually operated rollers and/or stepper motors attached to a corresponding screw. Of course, other actuators, as are well known in the art or as may later be developed, may be utilized according to the present invention to provide controllable translation as described herein, if desired.

Actuator 717 is preferably coupled to translation stage 711 for providing vertical movement of platform 733. Accordingly, actuator 717 may be utilized to cause shaft 715, and therefore probe 751, to engage a mounting apparatus for desired adjustment.

Platform 733 of the preferred embodiment includes flexure mount 740 disposed on a distal end thereof. Flexure mount 740 is coupled to shaft 715 and provides a flexible mount allowing shaft 715, once engaged with mounting apparatus 722, to transfer pitch and roll adjustment of mounting apparatus 722 in response to translation of platform 733 provided by actuators 720 and 730. The flexibility provided by the mount to allow shaft 715 to transfer pitch and roll adjustment of mounting apparatus 722 may be provided by structure other than the aforementioned flexure mount. For example, mount 740 may comprise a gimbal bearing, if desired.

According to a preferred embodiment, actuator 717 is used to bring shaft 715 into contact with a mount portion of mounting apparatus 722. Actuators 710, 720, and 730 of the preferred embodiment provide controlled movement, through shaft 715, of the mount portion of mounting apparatus 722 with three degrees of freedom. Specifically, actuator 710 of the illustrated embodiment provides controlled adjustment of yaw, actuator 720 of the illustrated embodiment provides controlled adjustment of roll, and actuator 730 of the illustrated embodiment provides controlled adjustment of pitch. Actuator 717 preferably holds a mating force between shaft 715 and the mount portion of mounting apparatus 722 until bonding of the mount portion to a corresponding member of mounting apparatus 722.

It should be appreciated that the above-identified movements associated with the various actuators may be different depending upon a particular mounting apparatus used therewith. For example, depending upon the mounting apparatus configuration, roll may be provided by actuator 730 rather than actuator 720.

According to a preferred embodiment, twisting of shaft 715 is achieved by moving actuator 710 against tangent arm 756 to thereby provide yaw adjustment with respect to mounting apparatus 722. Actuator 720 is preferably coupled to translation stage 721, configured to provide side to side movement of platform 733, to thereby provide roll adjustment with respect to mounting apparatus 722. Similarly, actuator 730 is preferably coupled to translation stage 731, configured to provide front to back movement of platform 733, to thereby provide pitch adjustment with respect to mounting apparatus 722.

It should be appreciated that control of the various actuators may be provided in a number of ways to result in desired placement of a particular component. For example, when the component being positioned is a micro-optic device, an operator may view an output beam of light for a recognizable trait while manipulating one or more of the aforementioned actuators. However, preferred embodiments utilize a control loop system to automatically provide adjustment of the actuators. For example, a controller, such as may include a processor based system having a central processor, memory, and an instruction set, as are well know in the art, may be coupled to stepper motors of the actuators and monitor an output of the system being manufactured in order to optimize the position of a component using one or more of the actuators.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An adjustable mounting system providing movement with at least three degrees of freedom, said system comprising:
   an attachment member adapted for attachment to a surface of a host system;
   a mount adapted for attachment to a component of said host system, said mount having an interface surface adapted to slidably interface with a corresponding interface surface of said attachment member, said mount also having a receiver adapted to receive a probe of external tooling for controlling said slidable interfacing with said attachment member; and
   an attachment element disposed in at least one of said attachment member and said mount for retaining said mount in a desired relationship with said attachment member.

2. The system of claim 1, wherein said three degrees of freedom include adjustment of yaw, pitch, and roll.

3. The system of claim 1, wherein said interface surface of at least one of said attachment member and said mount comprises a frustum of a sphere and the other interface surface of said attachment member and said mount comprises a corresponding socket.

4. The system of claim 3, wherein said interface surface of said mount comprises said frustum of a sphere, and wherein an aspect of said component is attached to said mount to correspond with a center of said sphere.

5. The system of claim 3, wherein said interface surface of said attachment member comprises said frustum of a sphere, and wherein said receiver is positioned upon said mount such that when said mount is interfaced with said attachment member said receiver is disposed over the center of said sphere so that there is substantially no overturning moment as external force is applied to said mount by said probe.

6. The system of claim 1, wherein said attachment element is adapted to retain said mount in said desired relationship with said attachment member without creep.

7. The system of claim 6, wherein said attachment element comprises a portion of said mount adapted to engage an adhesive.

8. The system of claim 6, wherein said attachment element comprises a portion of said mount adapted to accept a laser weld.

9. The system of claim 8, wherein said attachment element comprises a plurality of portions of said mount adapted to accept a laser weld, wherein said plurality of positions are arranged to cooperate to cancel effects of creep associated therewith.

10. The system of claim 6, wherein said attachment element comprises a compression interface.

11. The system of claim 6, wherein said attachment element comprises a portion of said mount adapted to accept solder.

12. The system of claim 1, wherein said attachment element is adapted to prevent biasing said attachment member and said mount when said attachment element is operated to provide a substantially permanent attachment therebetween.

13. The system of claim 1, wherein said receiver comprises a detent to accept at least a portion of said probe to thereby facilitate movement with respect to at least a first axis and second axis, and wherein said receiver comprises a surface to engage at least a portion of said probe to thereby facilitate movement with respect to at least a third axis.

14. The system of claim 13, wherein said detent comprises a circular opening and said surface to engage at least a portion of said probe comprises a surface of a corresponding pin hole.

15. The system of claim 13, wherein said detent comprises an opening having at least one flat side and said surface to engage at least a portion of said probe comprises said at least one flat side.

16. The system of claim 13, wherein said detent comprises at least one channel and said surface to engage at least a portion of said probe comprises a side of said at least one channel.

17. The system of claim 1, wherein said component comprises a micro-optic component.

18. The system of claim 17, wherein said micro-optic component comprises a laser diode array.

19. The system of claim 17, wherein said micro-optic component comprises a lens.

20. The system of claim 17, wherein said micro-optic component comprises a mirror.

21. The system of claim 17, wherein said micro-optic component comprises a diffraction grating.

22. The system of claim 17, wherein said host system comprises an incoherently beam combined laser.

23. A system for providing positioning adjustment of a micro-component disposed in a host apparatus, said system comprising:
   a mounting system which survives into said host apparatus, said mounting system comprising:
     an attachment member;
     a mount adapted for attachment to said micro-component, said mount having an interface surface adapted to slidably interface with a corresponding interface surface of said attachment member, said mount also having a receiver adapted to receive a probe of external tooling for controlling said slidable interfacing with said attachment member; and
     an attachment element disposed in at least one of said attachment member and
   said mount for retaining said mount in a desired relationship with said attachment member; and
     an external tooling system which interfaces temporarily with said mounting system, said external tooling system comprising:
       a translator providing controlled translation in a plurality of directions; and
       a probe coupled to said translator, wherein said probe is adapted to interface with said mount and provide controlled adjustment thereof in response to said translation.

24. The system of claim 23, wherein said attachment member is adapted for attachment to a surface of a host apparatus.

25. The system of claim 23, wherein said host apparatus comprises an incoherently beam combined laser.

26. The system of claim 23, wherein said micro-component comprises a laser diode array.

27. The system of claim 23, wherein said micro-component comprises a lens.

28. The system of claim 23, wherein said micro-component comprises a mirror.

29. The system of claim 23, wherein said micro-component comprises a diffraction grating.

30. The system of claim 23, wherein said positioning adjustment comprises three degrees of freedom.

31. The system of claim 23, wherein said translation comprises linear translation in a plurality of directions.

32. The system of claim 31, wherein said controlled adjustment of said mounting system in response to said translation comprises rotational adjustment.

33. The system of claim 31, wherein said translation further comprises rotational translation.

34. The system of claim 23, wherein said probe is coupled to said translator via a flexure mount.

35. The system of claim 23, wherein said interface surface of at least one of said attachment member and said mount comprises a frustum of a sphere and the other interface surface of said attachment member and said mount comprises a corresponding socket.

36. The system of claim 35, wherein said interface surface of said mount comprises said frustum of a sphere, and wherein said component is attached to said mount to correspond with a center of said sphere.

37. The system of claim 35, wherein said interface surface of said attachment member comprises said frustum of a sphere, and wherein said receiver is positioned upon said mount such that when said mount is interfaced with said attachment member said receiver is disposed over the center of said sphere so that there is substantially no overturning moment as external force is applied to said mount by said probe.

38. The system of claim 23, wherein said attachment element is adapted to retain said mount in said desired relationship with said attachment member without creep.

39. The system of claim 23, wherein said probe comprises a tab to engage a corresponding detent of said receiver and said probe further comprises a pin to engage a corresponding pin hole of said receiver.

40. The system of claim 23, wherein said probe comprises a member having at least one flat side to engage a corresponding orifice of said receiver.

41. The system of claim 23, wherein said probe comprises at least one ball surface to engage at least one channel of said receiver.

42. A method for providing adjustment of a micro-component, said method comprising:
    disposing said micro-component upon a ball and socket mounting apparatus;
    interfacing a probe with said ball and socket mounting apparatus;
    controlling movement of said probe to thereby provide adjustment of a relative position of a first portion of said ball and socket mounting apparatus with respect to a second portion of said ball and socket mounting apparatus;
    determining if said relative position is a desired relative position;
    engaging an attachment element of said ball and socket mounting apparatus to retain said relative position; and
    deinterfacing said probe from said ball and socket mounting apparatus.

43. The method of claim 42, wherein said disposing said micro-component upon said ball and socket mounting apparatus comprises disposing said micro-component at a position corresponding to a center of a sphere of said ball.

44. The method of claim 42, wherein said disposing said micro-component upon said ball and socket mounting apparatus comprises disposing said micro-component such that said probe interfaces with said ball and socket mounting apparatus at a position corresponding to a center of a sphere of said ball so that there is no overturning moment as external force is applied by said probe.

45. The method of claim 42, wherein said interfacing said probe with said ball and socket mounting apparatus comprises inserting at least a portion of said probe into an orifice of a receiver of said ball and socket mounting apparatus.

46. The method of claim 42, wherein said interfacing said probe with said ball and socket mounting apparatus comprises engaging at least one ball surface of said probe with a channel of a receiver of said ball and socket mounting apparatus.

47. The method of claim 42, wherein controlling movement of said probe comprises operating a plurality of translation actuators to provide controlled movement with respect to a plurality of translation stages.

48. The method of claim 42, wherein said determining if said relative position is a desired relative position comprises monitoring an operational aspect of said micro-component for identifying an optimum attainable said operational aspect.

49. The method of claim 48, wherein said controlling movement of said probe is accomplished as a function of said monitoring said operational aspect of said micro-component.

50. The method of claim 42, wherein said engaging an attachment element comprises exposing a portion of said attachment element to laser energy.

51. The method of claim 42, wherein said engaging an attachment element comprises introducing an adhesive to said attachment element.

52. the method of claim 42, wherein said engaging an attachment element comprises introducing solder to said attachment element.

53. The method of claim 42, wherein said engaging an attachment element comprises increasing a compressive force associated with said attachment element.

54. The method of claim 42, wherein said deinterfacing said probe comprises removing said probe completely from said ball and socket mounting apparatus such that said ball and socket mounting apparatus and not said probe survive into a product which includes said micro-component.

* * * * *